No. 823,680. PATENTED JUNE 19, 1906

J. P. GORDON.
TIRE COVER.
APPLICATION FILED JAN. 2, 1906.

WITNESSES:
Carl Stoughton

INVENTOR
John P. Gordon
BY
ATTORNEYS

UNITED STATES PATENT OFFICE.

JOHN P. GORDON, OF COLUMBUS, OHIO.

TIRE-COVER.

No. 823,680.   Specification of Letters Patent.   Patented June 19, 1906.

Application filed January 2, 1906. Serial No. 294,078.

*To all whom it may concern:*

Be it known that I, JOHN P. GORDON, a citizen of the United States, residing at Columbus, in the county of Franklin and State of Ohio, have invented certain new and useful Improvements in Tire-Covers, of which the following is a specification.

My invention relates to new and useful improvements in tire-covers.

The object of the invention is to provide a suitable waterproof protecting-cover for pneumatic tires which may be readily and expeditiously placed about the tire or removed therefrom, said cover being designed to protect the extra tire which is usually carried by automobiles.

Another feature resides in the peculiar construction whereby the tire is protected from dust and dirt and the weather.

Finally, the object of the invention is to provide a device of the character described which will be efficient and durable and not likely to get out of working order.

With the above and other objects in view the invention consists of the novel details of construction and operation, a preferable embodiment of which is described in the specification and illustrated in the accompanying drawings, wherein—

Figure 1:
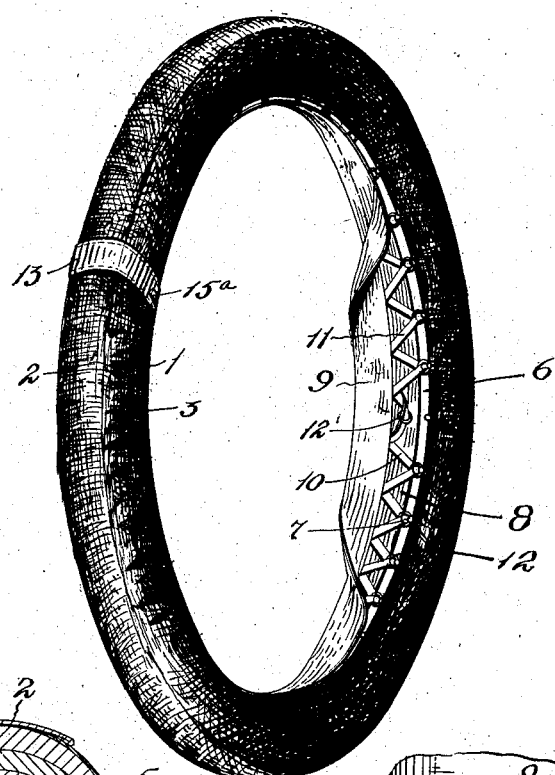
Figure 2:
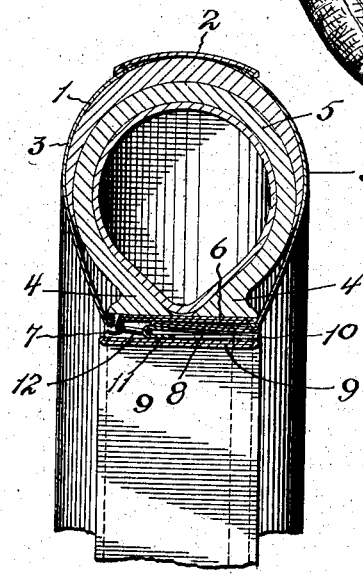
Figure 3:
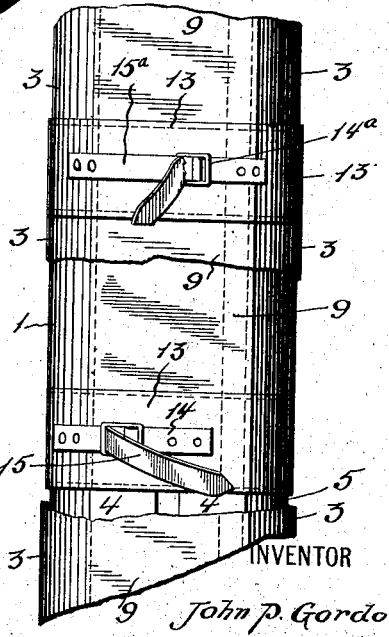

Figure 1 is a perspective view of my improved cover placed about a tire and a portion of the cover-flap turned back to show the fastening means. Fig. 2 is a partial transverse sectional view of the parts shown in Fig. 1; and Fig. 3 is a partial inner peripheral view, a portion of the cover being broken away to illustrate the manner of fastening the ends thereof in place.

In the drawings the numeral 1 designates the cover, which is formed of several pieces and any suitable waterproof material. In order to obtain the proper shape, the cover is made up of a tread-piece 2, and side pieces 3 are secured along one edge to the tread-piece. These pieces cover the sides and tread of the tire, the side pieces terminating adjacent the shoes 4 of the tire-casing 5. To the free edge of one of the side pieces 3 an inner flap 6 is secured. This flap is preferably formed of two layers of the waterproof material suitably secured together and is adapted to be folded in against the inner periphery or shoes of the tire-casing 5, as clearly shown in Fig. 2. Adjacent the intersection of the side 3 and the flap 6 a plurality of hooks 7 are secured, said hooks projecting outwardly.

To the free edge of the other side piece 3 a second flap 8 is secured. This flap, like the flap 6, is formed of doubled material and is adapted to overlap the said flap 6. However, it is somewhat less in width than the said flap, as will be apparent from an observation of Fig. 2. Along the line of intersection of the flap 8 and the side 3 a cover-flap 9 is secured. This cover-flap is also formed of doubled material and extends entirely across the inner periphery of the cover, so as to completely cover the hooks 7. Between the flap 8 and the cover-flap 9 a piece of elastic tape 10 is secured in such a manner as to form regularly-spaced loops 11, at the outer end of each of which a small metallic ring 12 is carried. These rings are adapted to be engaged over the hooks 7, and the loops are of such length as to be slightly stretched by this engagement, so as to draw the parts of the cover and the flaps 6 and 8 closely about the tire-casing and shoes. These elastic loops also permit a certain amount of adjustment, so that tires of various sizes may be placed in the cover and the same snugly engaged thereabout.

It is apparent that some provision must be made for accommodating tires of various diameters. To accomplish this, the ends of the cover are each provided with casings 13 and telescoped. On the inner or inserted end of the casing a buckle 14 is secured to that part of the casing 13 passed about the cover-flap 9, while a strap 15 is secured to that part of the casing 13 passing about the end of the side piece 3. The outer end of the casing, into which the inner end is telescoped, is fastened in a like manner by a buckle 14ª, secured to the flap 9, and a strap 15ª, secured to the side piece 3. In this way the ends are securely fastened and the diameter of the cover may be easily varied as required.

It is obvious that in order to remove the cover from the tire-casing it is merely necessary to disengage the straps 15 and 15ª from the buckles 14 and 14ª, turn back the cover-flap 9, and unhook the rings 12 from the hooks 7. A tire is as easily and readily placed in the cover, the rings engaged with the hooks, and the ends fastened by the straps and buckles.

What I claim is—

1. A cover for tires comprising connected side pieces, a flap secured to one of the side pieces, hooks arranged adjacent to the intersection of the side piece and flap, a second flap secured to the other side piece, elastic fastening means arranged adjacent the intersection of the second flap and the side piece and adapted to be engaged with the hooks, and a cover-flap extending over the hooks and the fastening means.

2. A vehicle-tire cover open entirely around its inner periphery, elastic fastening means carried by one of the edges of said covering and fastening devices carried by the other edge of said cover with which said elastic fastening means are adapted to engage.

In testimony whereof I affix my signature in presence of two witnesses.

JOHN P. GORDON.

Witnesses:
A. L. PHELPS,
M. B. SCHLEY.